(12) United States Patent
Mori et al.

(10) Patent No.: US 11,951,898 B2
(45) Date of Patent: Apr. 9, 2024

(54) VEHICLE LIGHTING DEVICE AND VEHICLE LAMP

(71) Applicant: Toshiba Lighting & Technology Corporation, Kanagawa (JP)

(72) Inventors: Hiraku Mori, Ehime (JP); Daisuke Kosugi, Ehime (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 18 days.

(21) Appl. No.: 17/889,360

(22) Filed: Aug. 16, 2022

(65) Prior Publication Data

US 2023/0271546 A1 Aug. 31, 2023

(30) Foreign Application Priority Data

Feb. 25, 2022 (JP) ................. 2022-028031

(51) Int. Cl.
| | | |
|---|---|---|
| *B60Q 1/00* | (2006.01) | |
| *F21S 43/14* | (2018.01) | |
| *F21S 43/19* | (2018.01) | |
| *F21W 107/10* | (2018.01) | |
| *F21Y 115/10* | (2016.01) | |

(Continued)

(52) U.S. Cl.
CPC ............ *B60Q 1/0088* (2013.01); *F21S 43/14* (2018.01); *F21S 43/19* (2018.01); *H05B 45/345* (2020.01); *H05B 47/105* (2020.01); *F21W 2107/10* (2018.01); *F21Y 2115/10* (2016.08)

(58) Field of Classification Search
CPC ........ B60Q 1/0088; F21S 43/14; F21S 43/19; H05B 47/105; H05B 45/345; F21W 2107/10; F21Y 2115/10
See application file for complete search history.

(56) References Cited

U.S. PATENT DOCUMENTS

2020/0309341 A1 10/2020 Fleszewski et al.
2021/0317955 A1* 10/2021 Jooss ..................... F21K 9/23
2022/0090752 A1 3/2022 Kosugi et al.

FOREIGN PATENT DOCUMENTS

CN 215850975 2/2022
DE 102020203645 A1 * 9/2021

(Continued)

OTHER PUBLICATIONS

Translation of DE-102020203645-A1, Jooss (Year: 2021).*
"Search Report of Europe Counterpart Application", dated May 17, 2023, pp. 1-7.

*Primary Examiner* — Renan Luque
(74) *Attorney, Agent, or Firm* — JCIPRNET (57) ABSTRACT

Provided are a vehicle lighting device and a vehicle lamp that can maintain lighting even when an input voltage drops. The vehicle lighting device according to an embodiment includes a socket; a substrate provided on one end side of the socket; a first circuit provided on the substrate; and a second circuit provided on the substrate. The first circuit has a plurality of first light emitting elements; and a control element electrically connected to the plurality of first light emitting elements and controlling a value of a current flowing through the plurality of first light emitting elements. The second circuit has second light emitting elements the number of which is smaller than the number of the plurality of first light emitting elements; and a resistor connected in series to the second light emitting elements.

4 Claims, 4 Drawing Sheets

(51) Int. Cl.
  *H05B 45/345* (2020.01)
  *H05B 47/105* (2020.01)

(56) References Cited

FOREIGN PATENT DOCUMENTS

| EP | 3457815 | 3/2019 |
| JP | 2015063252 | 4/2015 |
| WO | 9849872 | 11/1998 |

* cited by examiner

VEHICLE LIGHTING DEVICE AND VEHICLE LAMP

CROSS-REFERENCE TO RELATED APPLICATION

This application claims the priority benefit of Japanese application serial no. 2022-028031, filed on Feb. 25, 2022. The entirety of the above-mentioned patent application is hereby incorporated by reference herein and made a part of this specification.

BACKGROUND

Technical Field

Embodiments of the disclosure relate to a vehicle lighting device and a vehicle lamp.

Description of Related Art

From the viewpoints of energy saving and long service life, a vehicle lighting device equipped with light emitting elements such as light emitting diodes has been widely adopted in place of a vehicle lighting device equipped with filaments. Further, a vehicle lighting device that integrates a plurality of vehicle lighting devices for different uses, for example, has been proposed. For example, a lighting device for automobile, which has the function of a stop lamp and the function of a tail lamp, has been proposed.

In this case, the number of light emitting elements required may differ depending on the application. For example, as the stop lamp, a light emission distribution in which the peripheral region of the light emitting surface is bright is preferable, and as the tail lamp, a light emission distribution in which the central region of the light emitting surface is bright is preferable. Therefore, for example, a technique has been proposed to provide one light emitting element for the tail lamp and provide a plurality of light emitting elements connected in series for the stop lamp to surround the one light emitting element.

Here, because the voltage (input voltage) applied to the vehicle lighting device fluctuates, the operating standard voltage (rated voltage) is determined. For example, in the vehicle lighting device for general automobile, the operating standard voltage is set to about 13.5 V. Therefore, the number of light emitting elements and the resistance value of the resistor connected in series to the light emitting elements are set so that the predetermined total luminous flux can be obtained when the input voltage is 13.5 V.

However, the input voltage may drop extremely. For example, when the engine is started by cranking with a starter motor, the input voltage may be about 6 V. Therefore, in such a case, there is a risk that the lighting of the vehicle lighting device cannot be maintained. Thus, it has been desired to develop a technique that can maintain the lighting even when the input voltage drops.

CITATION LIST

Patent Literature

[Patent Literature 1] Japanese Patent Laid-Open No. 2015-63252

SUMMARY

Technical Problem

The disclosure provides a vehicle lighting device and a vehicle lamp that can maintain the lighting even when the input voltage drops.

Solution to Problem

A vehicle lighting device according to an embodiment includes a socket; a substrate provided on one end side of the socket; a first circuit provided on the substrate; and a second circuit provided on the substrate. The first circuit has a plurality of first light emitting elements; and a control element electrically connected to the plurality of first light emitting elements and controlling a value of a current flowing through the plurality of first light emitting elements. The second circuit has second light emitting elements the number of which is smaller than the number of the plurality of first light emitting elements; and a resistor connected in series to the second light emitting elements.

Effects

According to the embodiment of the disclosure, it is possible to provide a vehicle lighting device and a vehicle lamp that can maintain the lighting even when the input voltage drops.

DETAILED DESCRIPTION OF DISCLOSED EMBODIMENTS

Hereinafter, embodiments will be illustrated with reference to the drawings. In each drawing, similar components are assigned with the same reference numerals and detailed descriptions thereof will be omitted as appropriate.

(Vehicle Lighting Device)

A vehicle lighting device 1 according to the present embodiment can be provided on, for example, an automobile or a railroad vehicle. Further, the vehicle lighting device 1 can be used for a plurality of purposes. For example, the vehicle lighting device 1 may serve as a stop lamp as well as a tail lamp or may serve as a position lamp as well as a turn signal lamp. The following describes a case where the vehicle lighting device 1 serves as a stop lamp and a tail lamp as an example.

Figure 1:
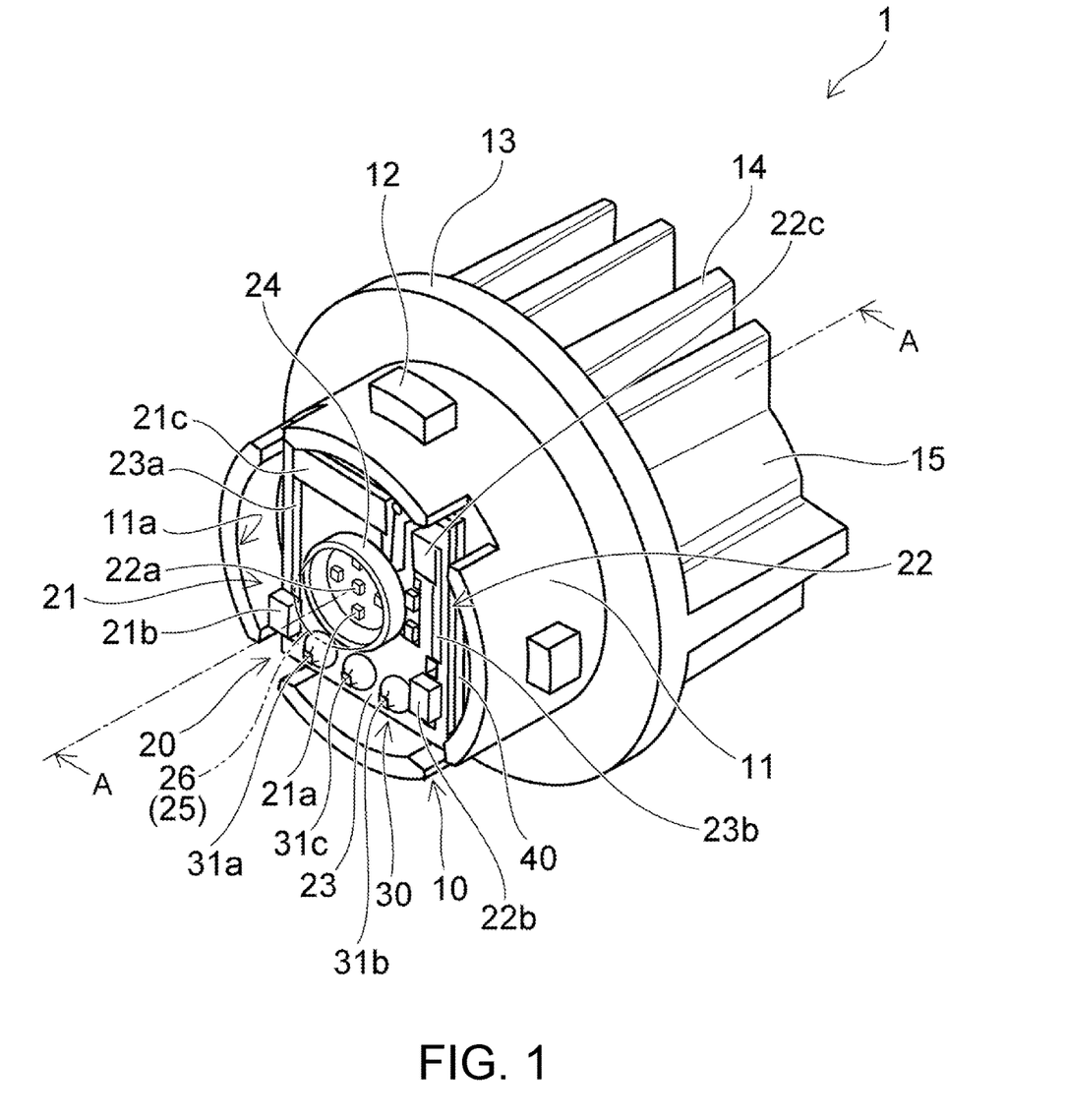
FIG. 1 is a schematic perspective view for illustrating the vehicle lighting device according to the present embodiment.
Figure 2:
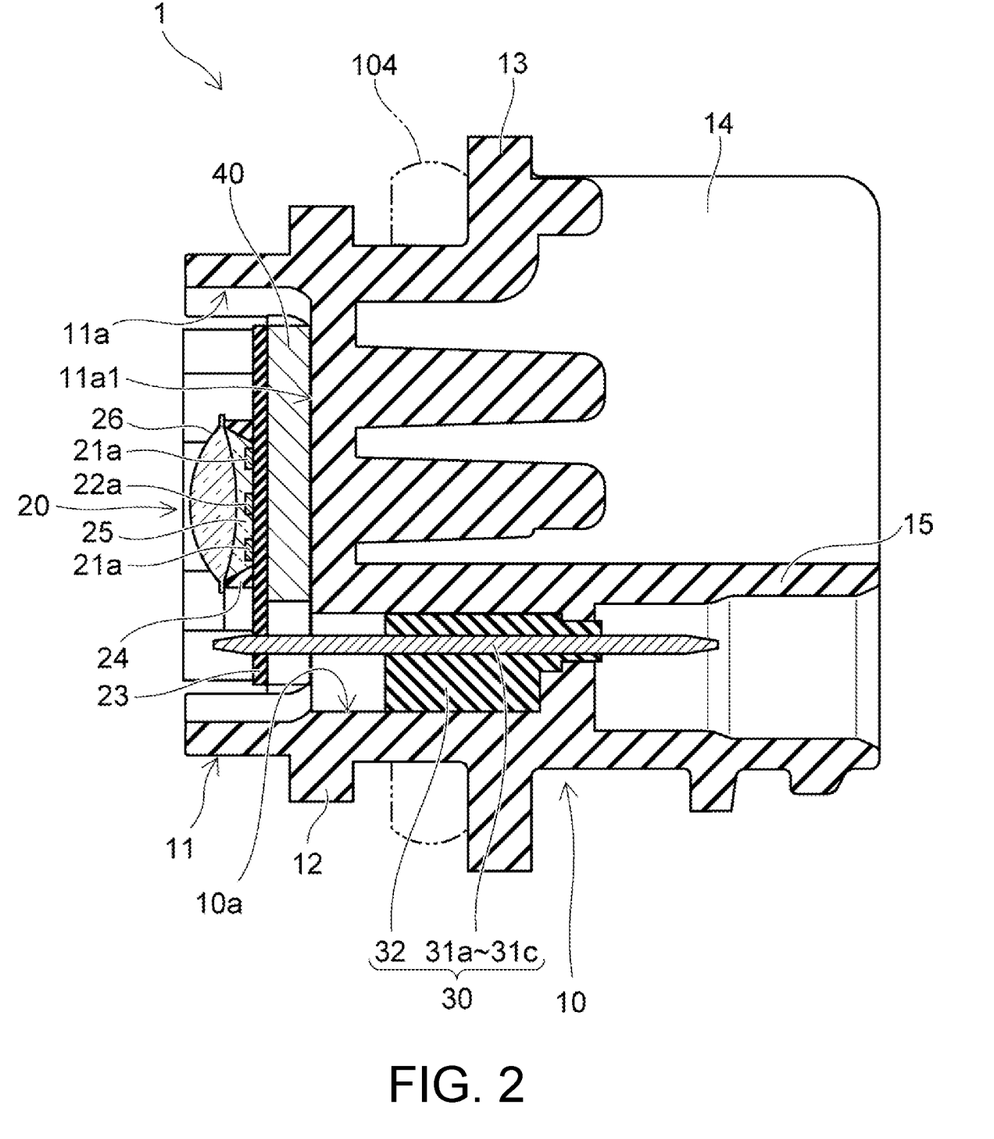
FIG. 2 is a cross-sectional view taken along the line A-A of the vehicle lighting device in FIG. 1.

FIG. 1 is a schematic perspective view for illustrating the vehicle lighting device 1 according to the present embodiment. FIG. 2 is a cross-sectional view taken along the line A-A of the vehicle lighting device 1 in FIG. 1. As shown in FIG. 1 and FIG. 2, the vehicle lighting device 1 is provided with, for example, a socket 10, a light emitting module 20, a power feeding part 30, and a heat transfer part 40.

The socket 10 has, for example, a mounting part 11, a bayonet 12, a flange 13, a heat dissipation fin 14, and a connector holder 15. The mounting part 11 is provided, for example, on a surface of the flange 13 on a side opposite to the side where the heat dissipation fin 14 is provided. The outer shape of the mounting part 11 can be columnar. The outer shape of the mounting part 11 is, for example, a columnar shape. The mounting part 11 has, for example, a recess 11a that opens at an end on the side opposite to the side of the flange 13.

The bayonet 12 is provided, for example, on a side surface of the mounting part 11. The bayonet 12 protrudes, for example, toward the outer side of the vehicle lighting device 1. The bayonet 12 faces the flange 13. A plurality of bayonets 12 can be provided. The bayonet is used when the vehicle lighting device 1 is mounted on a housing 101 of a vehicle lamp 100, which will be described later, for example. The bayonet 12 can be used for twist lock.

The flange 13 has, for example, a plate shape. The flange 13 has, for example, a substantially disk shape. A side surface of the flange 13 is located outside the vehicle lighting device 1 with respect to the side surface of the bayonet 12.

The heat dissipation fin 14 is provided, for example, on the side of the flange 13 opposite to the side of the mounting part 11. At least one heat dissipation fin 14 can be provided. For example, the socket 10 illustrated in FIG. 1 is provided with a plurality of heat dissipation fins 14. The plurality of heat dissipation fins 14 can be provided side by side in a predetermined direction. The heat dissipation fin 14 has, for example, a plate shape or a cylindrical shape.

The connector holder 15 is provided, for example, on the side of the flange 13 opposite to the side of the mounting part 11. The connector holder 15 can be provided side by side with the heat dissipation fin 14. The connector holder 15 has a cylindrical shape, and a connector having a seal member 105a is inserted inside the connector holder 15.

The socket 10 has a function of holding the light emitting module 20 and the power feeding part 30, and a function of transferring the heat generated in the light emitting module 20 to the outside. Therefore, the socket 10 is preferably made of a material having high thermal conductivity. For example, the socket 10 can be made of a metal such as an aluminum alloy.

Further, in recent years, it is desired that the socket 10 can efficiently dissipate the heat generated in the light emitting module 20 and is lightweight. Therefore, it is more preferable that the socket 10 is made of, for example, a high thermal conductive resin. The high thermal conductive resin includes, for example, a resin and a filler using an inorganic material. The high thermal conductive resin is, for example, a resin such as PET (polyethylene terephthalate) and nylon mixed with a filler using carbon, aluminum oxide or the like.

If the socket 10 contains a high thermal conductive resin and is integrally formed with the mounting part 11, the bayonet 12, the flange 13, the heat dissipation fin 14, and the connector holder 15, the heat generated in the light emitting module 20 can be efficiently dissipated. Further, the weight of the socket 10 can be reduced. In this case, the mounting part 11, the bayonet 12, the flange 13, the heat dissipation fin 14, and the connector holder 15 can be integrally molded using an injection molding method or the like. In addition, the socket 10, the power feeding part 30, and the heat transfer part 40 can be integrally molded using an insert molding method or the like, for example.

The light emitting module 20 has, for example, a first circuit 21, a second circuit 22, a substrate 23, a frame part 24, and a sealing part 25. The first circuit 21 can be, for example, a circuit of the stop lamp. The second circuit 22 can be, for example, a circuit of the tail lamp. Details of the first circuit 21 and the second circuit 22 will be described later.

The substrate 23 has a plate shape. The planar shape of the substrate 23 is, for example, a quadrangular shape. The substrate 23 is provided on one end side of the socket 10. The substrate 23 is adhered to, for example, the upper surface of the heat transfer part 40. When the heat transfer part 40 is not provided, the substrate 23 is adhered to the socket 10 (for example, a bottom surface 11a1 of the recess 11a). In this case, the adhesive is preferably an adhesive having high thermal conductivity. For example, the adhesive can be an adhesive mixed with a filler using an inorganic material.

The substrate 23 can be made of, for example, an inorganic material such as ceramics (for example, aluminum oxide or aluminum nitride), an organic material such as paper phenol and glass epoxy or the like. Further, the substrate 23 may be a metal core substrate in which the surface of a metal plate is coated with an insulating material. When the amount of heat generated by the first circuit 21 and the second circuit 22 is large, it is preferable to form the substrate 23 using a material having high thermal conductivity from the viewpoint of heat dissipation. Examples of the material having high thermal conductivity can include ceramics such as aluminum oxide and aluminum nitride, a high thermal conductive resin, and a metal core substrate. The substrate 23 may have a single-layer structure or may have a multi-layer structure.

The frame part 24 is provided on the substrate 23. The frame part 24 has a frame shape and is adhered onto the substrate 23. In the region surrounded by the frame part 24, a light emitting element 21a (corresponding to an example of the first light emitting element) and a light emitting element 22a (corresponding to an example of the second light emitting element) are arranged. The frame part 24 is made of, for example, a resin. The resin can be, for example, a thermoplastic resin such as PBT (polybutylene terephthalate), PC (polycarbonate), PET, nylon, PP (polypropylene), PE (polyethylene), and PS (polystyrene).

The frame part 24 can have a function of defining the formation range of the sealing part 25 and a function of a reflector. Therefore, the frame part 24 can contain particles of titanium oxide or contain a white resin in order to improve the reflectivity.

Further, the frame part 24 can be omitted. However, if the frame part 24 is provided, the utilization efficiency of the light emitted from the light emitting elements 21a and 22a can be improved. In addition, since the range in which the sealing part 25 is formed can be reduced, the light emitting module 20 can be miniaturized and eventually the vehicle lighting device 1 can be miniaturized.

The sealing part 25 is provided on the inner side of the frame part 24. The sealing part 25 is provided so as to cover the region surrounded by the frame part 24. The sealing part is provided so as to cover the light emitting elements 21a and 22a. The sealing part 25 contains a translucent resin. The sealing part 25 is formed, for example, by filling a resin on the inner side of the frame part 24. The filling of the resin is performed using, for example, a dispenser or the like. The resin to be filled is, for example, a silicone resin. When the frame part 24 is omitted, for example, a dome-shaped sealing part 25 is provided on the substrate 23.

Further, the sealing part 25 can contain a phosphor. The phosphor can be, for example, a YAG-based phosphor (yttrium-aluminum-garnet-based phosphor) or the like. However, the type of the phosphor can be appropriately changed so as to obtain a predetermined emission color according to the purpose of the vehicle lighting device 1.

In addition, an optical element 26 can also be provided if necessary. The optical element 26 can be provided, for example, on the sealing part 25. The optical element 26 can be, for example, a convex lens, a concave lens, a light guide body or the like.

The power feeding part 30 has, for example, a power feeding terminal 31a, a power feeding terminal 31b, a power feeding terminal 31c, and a holding part 32. As will be described later, the first circuit 21 and the second circuit 22 have a common ground (see FIG. 4). Therefore, the power feeding terminals 31a to 31c are provided as shown in FIG. 1. The following illustrates the case where the power feeding terminals 31a to 31c are provided as an example, but the number of power feeding terminals can be appropriately changed according to the number of circuits, the usage mode of the ground or the like.

The power feeding terminals 31a to 31c can each have a rod shape. One end of each of the power feeding terminals 31a to 31c protrudes from the bottom surface 11a1 of the recess 11a. The power feeding terminals 31a to 31c can be provided side by side in a predetermined direction. One end of each of the power feeding terminals 31a to 31c is soldered to the wiring patterns 23a and 23b provided on the substrate 23. The other end of each of the power feeding terminals 31a to 31c is exposed inside the hole of the connector holder 15. The connector 105 is fitted to the ends of the power feeding terminals 31a to 31c exposed inside the hole of the connector holder 15. The power feeding terminals 31a to 31c are made of, for example, a metal such as a copper alloy. The shape, arrangement, material, etc. of the power feeding terminals 31a to 31c are not limited to those illustrated, and can be appropriately changed.

As described above, the socket 10 is preferably made of a material having high thermal conductivity. However, the material having high thermal conductivity may have electrical conductivity. For example, a metal such as an aluminum alloy or a high thermal conductive resin containing a filler composed of carbon has electrical conductivity. Therefore, the holding part 32 is provided to insulate between the power feeding terminals 31a to 31c and the socket 10 that has electrical conductivity. The holding part 32 also has a function of holding the power feeding terminals 31a to 31c. When the socket 10 is made of an insulating high thermal conductive resin (for example, a high thermal conductive resin containing a filler composed of aluminum oxide), the holding part 32 can be omitted. In this case, the socket 10 holds the power feeding terminals 31a to 31c. The holding part 32 is made of, for example, an insulating resin. The holding part 32 can be press-fitted into the hole 10a provided in the socket 10 or adhered to the inner wall of the hole 10a, for example.

The heat transfer part 40 is provided, for example, between the substrate 23 and the bottom surface 11a1 of the recess 11a. The heat transfer part 40 can be adhered to, for example, the bottom surface 11a1 of the recess 11a. The adhesive for adhering the heat transfer part 40 and the bottom surface 11a1 of the recess 11a is preferably an adhesive having high thermal conductivity. The adhesive can be, for example, the same as the adhesive that adheres the substrate 23 and the heat transfer part 40.

Further, the heat transfer part 40 can also be embedded in the bottom surface 11a1 of the recess 11a by an insert molding method. In addition, the heat transfer part 40 can also be attached to the bottom surface 11a1 of the recess 11a via a layer composed of thermal conductive grease (heat dissipation grease). The type of the thermal conductive grease is not particularly limited, but can be obtained, for example, by mixing a modified silicone with a filler using a material having high thermal conductivity (for example, ceramics such as aluminum oxide and aluminum nitride).

The heat transfer part 40 is provided in order to easily transfer the heat generated in the light emitting module 20 to the socket 10. Therefore, the heat transfer part 40 is preferably made of a material having high thermal conductivity. The heat transfer part 40 has a plate shape, and can be made of, for example, a metal such as aluminum, an aluminum alloy, copper and a copper alloy. When the heat generated in the light emitting module 20 is little, the heat transfer part 40 can be omitted.

Figure 3:
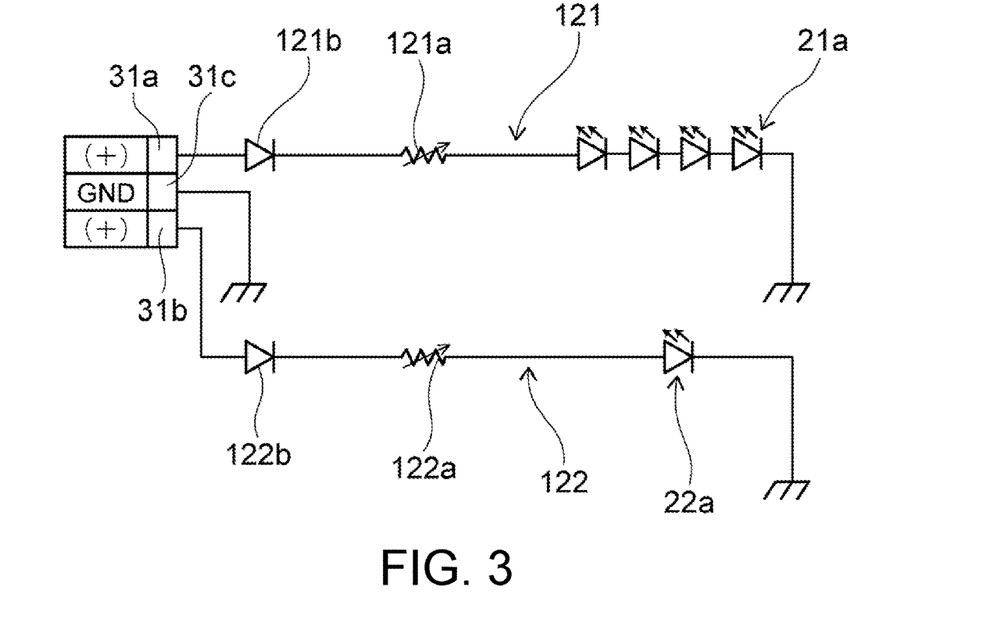
FIG. 3 is a circuit diagram of the circuit according to a comparative example.

Next, the first circuit 21 and the second circuit 22 will be further described. First, a circuit 121 and a circuit 122 according to a comparative example will be described. FIG. 3 is a circuit diagram of the circuit 121 and the circuit 122 according to the comparative example. The circuit 121 is a circuit of the stop lamp. As shown in FIG. 3, the circuit 121 has four light emitting elements 21a, a resistor 121a, and a diode 121b. The four light emitting elements 21a, the resistor 121a, and the diode 121b are connected in series.

The circuit 122 is a circuit of the tail lamp. As shown in FIG. 3, the circuit 122 has a light emitting element 22a, a resistor 122a, and a diode 122b. The light emitting element 22a, the resistor 122a, and the diode 122b are connected in series.

Since the forward voltage characteristics of the light emitting elements 21a and 22a vary, when the applied voltage between the anode terminal (power feeding terminals 31a and 31b) and the ground terminal (power feeding terminal 31c) is set constant, the brightness (luminous flux, luminance, luminous intensity, illuminance) of the light emitted from the light emitting elements 21a and 22a varies. Therefore, the resistance value of the resistor 121a connected in series to the light emitting element 21a is changed according to the forward voltage characteristics of the light emitting element 21a so as to set the value of the current flowing through the light emitting element 21a within a predetermined range. Further, the resistance value of the resistor 122a connected in series to the light emitting element 22a is changed according to the forward voltage characteristics of the light emitting element 22a so as to set the value of the current flowing through the light emitting element 22a within a predetermined range.

If the value of the current flowing through the light emitting elements 21a and 22a is within a predetermined range, the brightness of the light emitted from the light emitting elements 21a and 22a can be kept within a predetermined range. That is, the circuit 121 and the circuit 122 according to the comparative example are resistance drive circuits.

Here, the voltage (input voltage) applied to the vehicle lighting device fluctuates. For example, in the case of a vehicle lighting device for general automobile, the operating standard voltage (rated voltage) is about 13.5 V. Therefore, the resistance values of the resistors 121a and 122a are set so that a predetermined total luminous flux can be obtained when the input voltage is 13.5 V.

However, the input voltage may drop extremely. For example, when the engine is started by cranking with a starter motor, the input voltage may be about 6 V.

Generally, the voltage drop in the forward direction of the light emitting elements 21a and 22a is about 3 V. Therefore, in the circuit 121 in which the four light emitting elements 21a and the resistor 121a are connected in series, the voltage drop is 12 V or more. Therefore, when the engine is started, the lighting of the circuit 121, which is the circuit of the stop lamp, cannot be maintained. In addition, the input voltage may fluctuate even when the vehicle is running. For example, in the case of a vehicle lighting device for automobile, the input voltage may fluctuate in the range of 9 V or more and 16 V or less. Therefore, even if the input voltage fluctuates in such a range, it may not be possible to maintain the lighting of the circuit 121, which is the circuit of the stop lamp, or the required total luminous flux may not be obtained.

Figure 4:
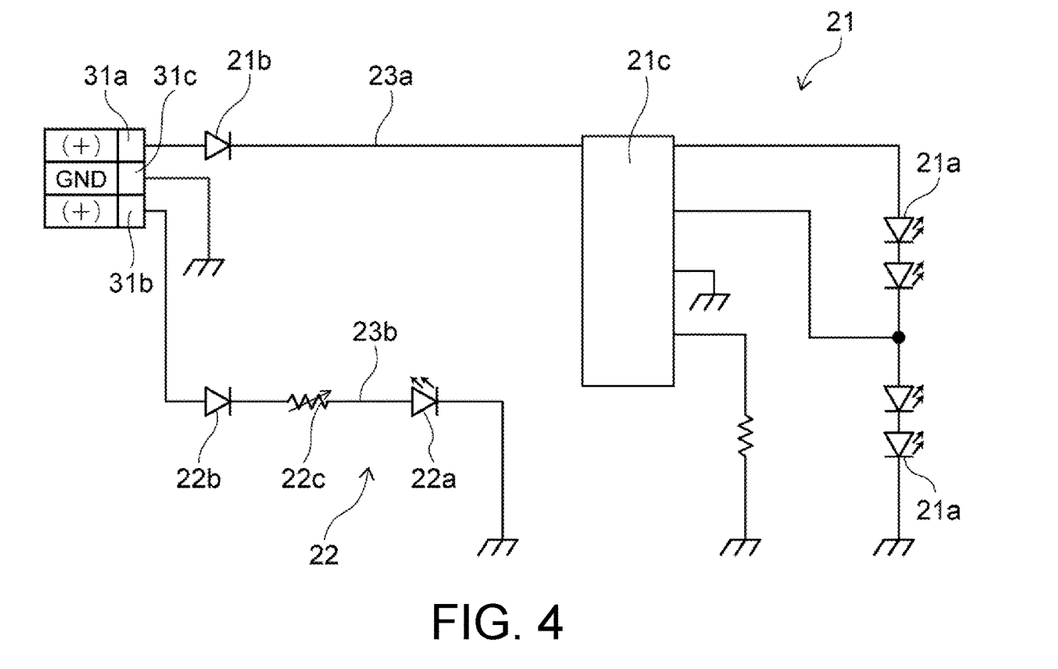
FIG. 4 is a circuit diagram for illustrating the first circuit and the second circuit.

FIG. 4 is a circuit diagram for illustrating the first circuit 21 and the second circuit 22. As described above, the first circuit 21 is, for example, a circuit of the stop lamp. The first circuit 21 is provided on the substrate 23. As shown in FIG. 4, the first circuit 21 has, for example, a plurality of light emitting elements 21a, a diode 21b, and a control element 21c. For example, as shown in FIG. 1 and FIG. 4, the first circuit 21 can be provided with four light emitting elements 21a. However, the number of light emitting elements 21a is not limited to the illustrated example.

As shown in FIG. 1, the plurality of light emitting elements 21a, the diode 21b, and the control element 21c are provided on the substrate 23. The plurality of light emitting elements 21a, the diode 21b, and the control element 21c are connected in series via the wiring pattern 23a. The first circuit 21 is electrically connected to the power feeding terminal 31a and the power feeding terminal 31c via the wiring pattern 23a.

The light emitting element 21a can be, for example, a light emitting diode, an organic light emitting diode, a laser diode or the like. The light emitting element 21a can also be a chip-shaped light emitting element, a surface mount type light emitting element such as a PLCC (Plastic Leaded Chip Carrier) type or a light emitting element having a lead wire such as a shell type. The light emitting element 21a illustrated in FIG. 1 and FIG. 2 is a chip-shaped light emitting element. In this case, if the light emitting element 21a is a surface mount type light emitting element or a light emitting element having a lead wire such as a shell type, the above-mentioned frame part 24 and sealing part 25 can be omitted. However, considering the miniaturization of the light emitting module 20 and eventually the miniaturization of the vehicle lighting device 1, it is preferable to use a chip-shaped light emitting element. The following describes the case where the light emitting element 21a is a chip-shaped light emitting element as an example.

The chip-shaped light emitting element 21a can be mounted on the wiring pattern 23a by COB (Chip On Board). The chip-shaped light emitting element 21a may be, for example, any of an upper electrode type light emitting element, an upper and lower electrode type light emitting element, and a flip chip type light emitting element. The number, size, arrangement, etc. of the light emitting elements 21a are not limited to those illustrated, and can be appropriately changed according to the size of the vehicle lighting device 1 and the purpose of the first circuit 21.

The diode 21b is electrically connected between the power feeding terminal 31a and the light emitting element 21a and the control element 21c. The diode 21b is provided, for example, to prevent a reverse voltage from being applied to the light emitting element 21a and the control element 21c, and prevent pulse noise from the reverse direction from being applied to the light emitting element 21a and the control element 21c. The diode 21b is, for example, a surface mount type diode, a diode having a lead wire or the like. The diode 21b illustrated in FIG. 1 is a surface mount type diode.

The control element 21c is electrically connected between the diode 21b and the plurality of light emitting elements 21a. Since the forward voltage characteristics of the light emitting element 21a vary, when the applied voltage between the power feeding terminal 31a and the power feeding terminal 31c is set constant, the brightness (luminous flux, luminance, luminous intensity, illuminance) of the light emitted from the light emitting element 21a varies. Further, when the input voltage fluctuates, the brightness of the light emitted from the light emitting element 21a fluctuates. Therefore, the control element 21c controls the value of the current flowing through the plurality of light emitting elements 21a. For example, the control element 21c sets the value of the current flowing through the plurality of light emitting elements 21a substantially constant. The control element 21c can have, for example, a mirror circuit, a constant current circuit using a constant current diode, a current limiter circuit using a transistor, a constant current IC or the like.

Further, if the plurality of light emitting elements 21a are connected in series, when the input voltage drops, the value of the current flowing through the plurality of light emitting elements 21a decreases, and there is a risk that the required total luminous flux cannot be obtained. Therefore, the control element 21c can detect the input voltage and change the number of the light emitting elements 21a through which the current flows according to the input voltage detected. For example, as shown in FIG. 4, when the input voltage is higher than a predetermined voltage, the control element 21c causes a current to flow through the four light emitting elements 21a connected in series. When the input voltage is lower than a predetermined voltage, the control element 21c causes a current to flow through two light emitting elements 21a connected in series, and does not allow a current to flow through the other two light emitting elements 21a connected in series. In this way, it is possible to suppress the value of the current flowing through the two light emitting elements 21a from decreasing when the input voltage drops. Therefore, when the input voltage drops, the required total luminous flux can be secured, and the fluctuation of the total luminous flux can be suppressed.

As described above, the second circuit 22 is, for example, a circuit of the tail lamp. The second circuit 22 is provided on the substrate 23. As shown in FIG. 4, the second circuit has, for example, a light emitting element 22a, a diode 22b, and a resistor 22c. As shown in FIG. 1, the light emitting element 22a, the diode 22b, and the resistor 22c are provided on the substrate 23. The light emitting element 22a, the diode 22b, and the resistor 22c are connected in series via the wiring pattern 23b. The second circuit 22 is electrically connected to the power feeding terminal 31b and the power feeding terminal 31c via the wiring pattern 23b.

The light emitting element 22a can be the same as the above-mentioned light emitting element 21a. However, the number of light emitting elements 22a is smaller than the number of light emitting elements 21a. For example, as shown in FIG. 1 and FIG. 4, one light emitting element 22a can be provided in the second circuit 22. However, a plurality of light emitting elements 22a may be provided.

In this case, as the stop lamp, a light emission distribution in which the peripheral region of the light emitting surface (for example, the surface of the optical element 26 on the side opposite to the side of the sealing part 25) is bright is preferable, and as the tail lamp, a light emission distribution in which the central region of the light emitting surface is bright is preferable.

Therefore, for example, it is preferable to provide one light emitting element 22a in the second circuit 22 for the tail lamp. Further, it is preferable to provide the plurality of light emitting elements 21a in the first circuit 21 for the stop lamp. In this case, the plurality of light emitting elements 21a can be provided at positions surrounding the light emitting element 22a. In this way, a preferable light emission distribution can be obtained regardless of whether the vehicle lighting device 1 is used as a tail lamp or the vehicle lighting device 1 is used as a stop lamp.

The diode 22b is electrically connected between the power feeding terminal 31b and the light emitting element 22a and the resistor 22c. The diode 22b is provided, for example, to prevent a reverse voltage from being applied to the light emitting element 22a, and prevent pulse noise from the reverse direction from being applied to the light emitting element 22a. The diode 22b can be the same as the above-mentioned diode 21b.

The resistor 22c is electrically connected between the diode 22b and the light emitting element 22a. Similar to the light emitting element 21a, the forward voltage characteristics of the light emitting element 22a also vary, so when the applied voltage between the power feeding terminal 31b and the power feeding terminal 31c is set constant, the brightness (luminous flux, luminance, luminous intensity, illuminance) of the light emitted from the light emitting element 22a varies.

Therefore, the resistor 22c connected in series to the light emitting element 22a keeps the value of the current flowing through the light emitting element 22a within a predetermined range so that the brightness of the light emitted from the light emitting element 22a is kept within a predetermined range. In this case, the resistance value of the resistor 22c is changed so as to set the value of the current flowing through the light emitting element 22a within a predetermined range.

The resistor 22c can be, for example, a surface mount type resistor, a resistor having a lead wire (metal oxide film resistor), a membranous resistor formed by using a screen printing method or the like. The resistor 22c illustrated in FIG. 1 is a membranous resistor.

The material of the membranous resistor is, for example, ruthenium oxide ($RuO_2$). The membranous resistor is formed using, for example, a screen printing method and a baking method. If the resistor 22c is a membranous resistor, the contact area between the resistor 22c and the substrate 23 can be increased, so the heat dissipation can be improved. In addition, it is possible to improve productivity and suppress variation of the resistance value.

When the resistor 22c is a surface mount type resistor or a resistor having a lead wire, the resistor 22c having an appropriate resistance value is selected according to the forward voltage characteristics of the light emitting element 22a. When the resistor 22c is a membranous resistor, the resistance value can be increased by removing a part of the resistor 22c. For example, a part of the membranous resistor can be easily removed if the membranous resistor is irradiated with a laser light. The number and size of the resistors 22c are not limited to those illustrated, and can be appropriately changed according to the number and specifications of the light emitting elements 22a.

Further, at least one of the first circuit 21 and the second circuit 22 can be further provided with a passive element or an active element used for constituting a light emitting circuit. For example, at least one of the first circuit 21 and the second circuit 22 can be further provided with a capacitor, a positive characteristic thermistor, a negative characteristic thermistor, an inductor, a surge absorber, a varistor, a transistor such as a FET and a bipolar transistor, an integrated circuit, an arithmetic element or the like.

As described above, the control element 21c is provided in the first circuit 21 having the plurality of light emitting elements 21a. Therefore, it is possible to maintain the lighting of the plurality of light emitting elements 21a and maintain the required total luminous flux even when the input voltage drops extremely (for example, about 6 V). Further, since the control element 21c can change the number of light emitting elements 21a through which the current flows according to the input voltage, the required total luminous flux can be secured, and the fluctuation of the total luminous flux can be suppressed.

In this case, the control element 21c can also be provided in the second circuit 22 in place of the resistor 22c. However, since the number of light emitting elements 22a provided in the second circuit 22 is smaller than the number of light emitting elements 21a provided in the first circuit 21, it is easy to maintain the lighting of the light emitting elements 22a and maintain the required total luminous flux even when the input voltage drops extremely. Further, the resistor 22c costs less in price and is smaller in size than the control element 21c. Therefore, if the resistor 22c is provided in the second circuit 22, the cost and size of the vehicle lighting device 1 can be reduced.

(Vehicle Lamp)

Next, the vehicle lamp 100 will be illustrated. The following describes a case where the vehicle lamp 100 is a rear combination light provided on an automobile as an example. However, the vehicle lamp 100 is not limited to the rear combination light provided on the automobile. The vehicle lamp 100 may be any vehicle lamp that is provided on an automobile, a railroad vehicle or the like for a plurality of purposes.

Figure 5:
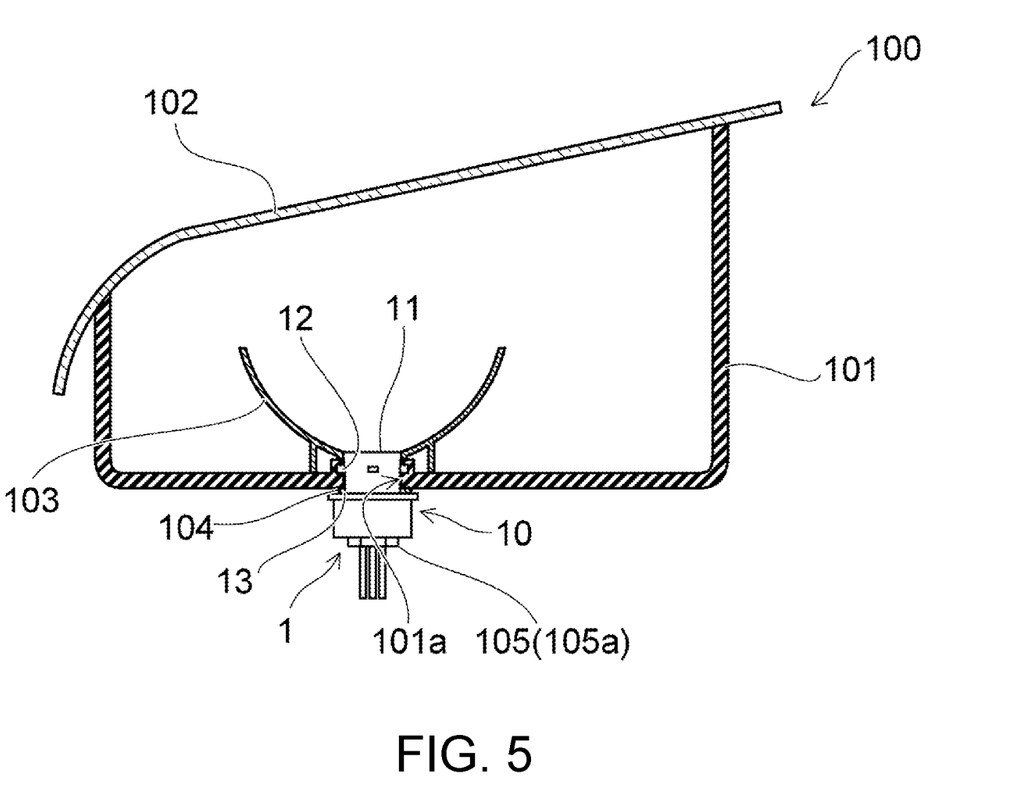
FIG. 5 is a schematic partial cross-sectional view for illustrating the vehicle lamp.

FIG. 5 is a schematic partial cross-sectional view for illustrating the vehicle lamp 100. As shown in FIG. 5, the vehicle lamp 100 includes, for example, the vehicle lighting device 1, the housing 101, a cover 102, an optical element 103, a seal member 104, and the connector 105.

The vehicle lighting device 1 is attached to the housing 101. The housing 101 holds the mounting part 11. The housing 101 has a box shape with one end side open. The housing is made of, for example, a resin that does not transmit light. The bottom surface of the housing 101 is provided with an attachment hole 101a into which a portion of the mounting part provided with the bayonet 12 is inserted. A recess for inserting the bayonet 12 provided on the mounting part 11 is provided on the peripheral edge of the attachment hole 101a. Although it is illustrated that the attachment hole 101a is directly provided in the housing 101, an attachment member having the attachment hole 101a may be provided in the housing 101.

When the vehicle lighting device 1 is attached to the vehicle lamp 100, the portion of the mounting part 11 provided with the bayonet 12 is inserted into the attachment hole 101a, and the vehicle lighting device 1 is rotated. Then, for example, the bayonet 12 is held in a fitting part provided on the peripheral edge of the attachment hole 101a. Such an attaching method is called twist lock.

The cover 102 is provided to close the opening of the housing 101. The cover 102 is made of a translucent resin or the like. The cover 102 can also have a function of a lens.

The light emitted from the vehicle lighting device 1 is incident on the optical element 103. The optical element 103 reflects, diffuses, guides, collects light, and forms a predetermined light distribution pattern of the light emitted from the vehicle lighting device 1. For example, the optical element 103 illustrated in FIG. 5 is a reflector. In this case, the optical element 103 reflects the light emitted from the vehicle lighting device 1 to form a predetermined light distribution pattern.

The seal member 104 is provided between the flange 13 and the housing 101. The seal member 104 has an annular shape and is made of an elastic material such as rubber and a silicone resin.

When the vehicle lighting device 1 is attached to the vehicle lamp 100, the seal member 104 is sandwiched between the flange 13 and the housing 101. Therefore, the internal space of the housing 101 can be sealed by the seal member 104. Further, the bayonet 12 is pressed against the housing 101 by the elastic force of the seal member 104. Therefore, it is possible to prevent the vehicle lighting device 1 from being detached from the housing 101.

The connector 105 is fitted to the ends of the power feeding terminals 31a to 31c exposed inside the connector holder 15. A power supply (not shown) or the like is electrically connected to the connector 105. Therefore, by fitting the connector 105 to the ends of the power feeding terminals 31a to 31c, the power supply (not shown) or the like can be electrically connected to the first circuit 21 and the second circuit 22.

In addition, the connector 105 is provided with the seal member 105a. When the connector 105 having the seal member 105a is inserted into the connector holder 15, the inside of the connector holder 15 is sealed to be watertight.

Although some embodiments of the disclosure have been illustrated above, these embodiments are presented as examples and are not intended to limit the scope of the disclosure. These novel embodiments can be implemented in various other forms, and various omissions, replacements, changes, etc. can be made without departing from the gist of the disclosure. These embodiments and variations thereof are included in the scope and gist of the disclosure, and are also included in the scope of the disclosure defined in the claims and the equivalent scope thereof. In addition, the above-mentioned embodiments can be implemented in combination with each other.

What is claimed is:

1. A vehicle lighting device, comprising:
   a socket;
   a substrate provided on one end side of the socket;
   a first circuit provided on the substrate; and
   a second circuit provided on the substrate,
   wherein the first circuit has:
      a plurality of first light emitting elements; and
      a control element electrically connected to the plurality of first light emitting elements and controlling a value of a current flowing through the plurality of first light emitting elements,
   wherein the second circuit has:
      second light emitting elements the number of which is smaller than the number of the plurality of first light emitting elements; and
      a resistor connected in series to the second light emitting elements,
   wherein the control element detects an input voltage and changes the number of the first light emitting elements through which the current flows according to the input voltage detected.

2. The vehicle lighting device according to claim 1, wherein the control element makes the value of the current flowing through the plurality of first light emitting elements substantially constant, and
   the resistor sets the value of the current flowing through the second light emitting elements within a predetermined range.

3. The vehicle lighting device according to claim 1, wherein the plurality of first light emitting elements are provided at positions surrounding the second light emitting elements.

4. A vehicle lamp, comprising:
   the vehicle lighting device according to claim 1; and
   a housing to which the vehicle lighting device is attached.

* * * * *